United States Patent [19]
Fujimura et al.

[11] Patent Number: 5,390,873
[45] Date of Patent: Feb. 21, 1995

[54] SEAT BELT RETRACTOR

[75] Inventors: Yoshiichi Fujimura, Shiga; Shizutaka Matsuura, Hikone, both of Japan

[73] Assignee: Takata Corporation, Tokyo, Japan

[21] Appl. No.: 859,829

[22] Filed: Mar. 30, 1992

[30] Foreign Application Priority Data

Apr. 11, 1991 [JP] Japan .................. 3-079144

[51] Int. Cl.[6] ................ B60R 22/38; B60R 22/40
[52] U.S. Cl. .................. 242/383.2; 242/384.6
[58] Field of Search .......... 242/107.4 A, 107.4 B, 242/107.4 C; 280/806; 297/478, 480

[56] References Cited

U.S. PATENT DOCUMENTS

| | | | |
|---|---|---|---|
| 3,865,329 | 2/1975 | Higbee et al. | 242/107.4 A |
| 4,069,987 | 1/1978 | Fisher | 242/107.4 A |
| 4,083,511 | 4/1978 | Ikesue | 242/107.4 A |
| 4,094,475 | 6/1978 | Takada | 242/107.4 A |
| 4,307,852 | 12/1981 | Seifert et al. | 242/107.4 A |
| 4,366,934 | 1/1983 | Seifert et al. | 242/107.4 A |
| 4,369,932 | 1/1983 | Seifert et al. | 242/107.4 A |
| 4,674,700 | 6/1987 | Andersson | 242/107.4 R |
| 4,802,634 | 2/1989 | Singer | 242/107.4 A |
| 4,907,820 | 3/1990 | Fohl | 242/107.4 A X |

FOREIGN PATENT DOCUMENTS 2156198A 10/1985 United Kingdom .

*Primary Examiner*—John M. Jillions
*Attorney, Agent, or Firm*—Armstrong, Westerman, Hattori, McLeland & Naughton

[57] ABSTRACT

When deceleration in excess of a predetermined value acts upon a vehicle and/or when a seat belt is pulled at an acceleration in excess of a predetermined value, lock actuating means sets a state in which a first engaging member supported on a reel shaft is capable of engaging a first engaged portion of a frame, thenceforth sets a state in which a second engaging member supported on the reel shaft is capable of engaging a second engaged portion of the frame, and then engages the first engaged portion an the first engaging member as Well as the second engaged portion and the second engaging member. As a result, engagement between the first engaged portion and the first engaging member and between the second engaged portion and the second engaging member is performed in reliable fashion. Accordingly, the reel shaft is assuredly locked against turning at both its ends in the seat belt pulling direction.

2 Claims, 14 Drawing Sheets

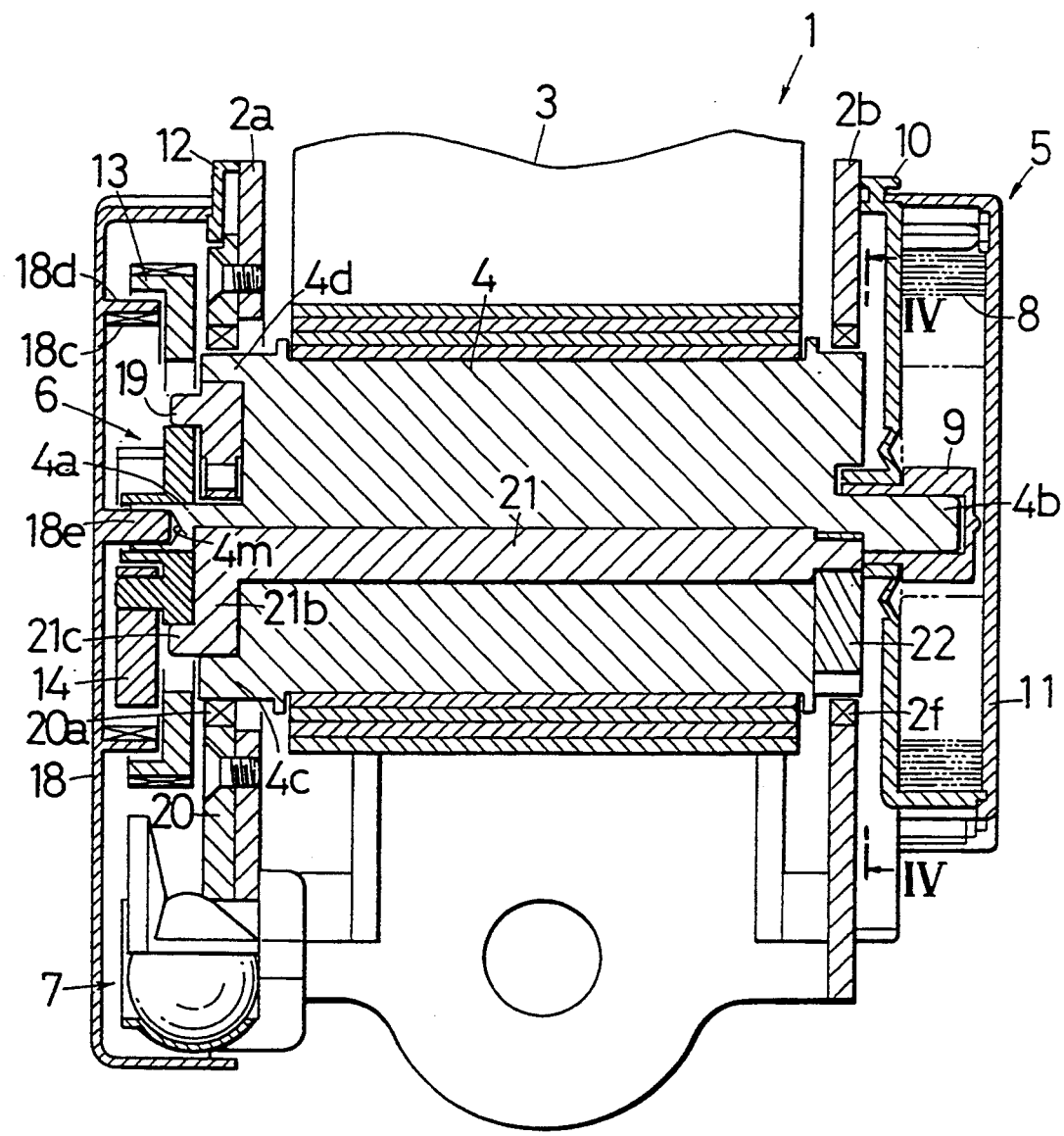
F I G. 3

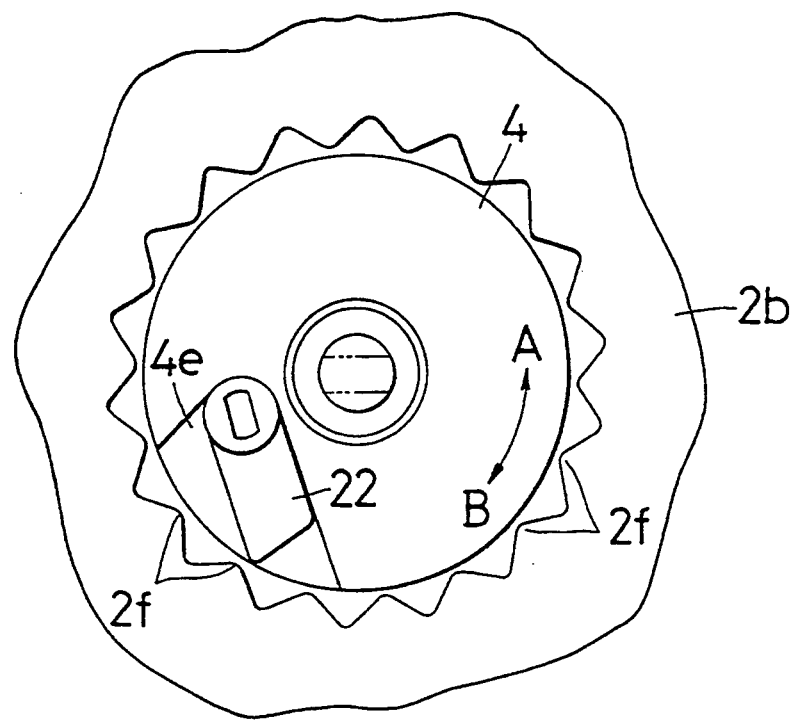
F I G. 4
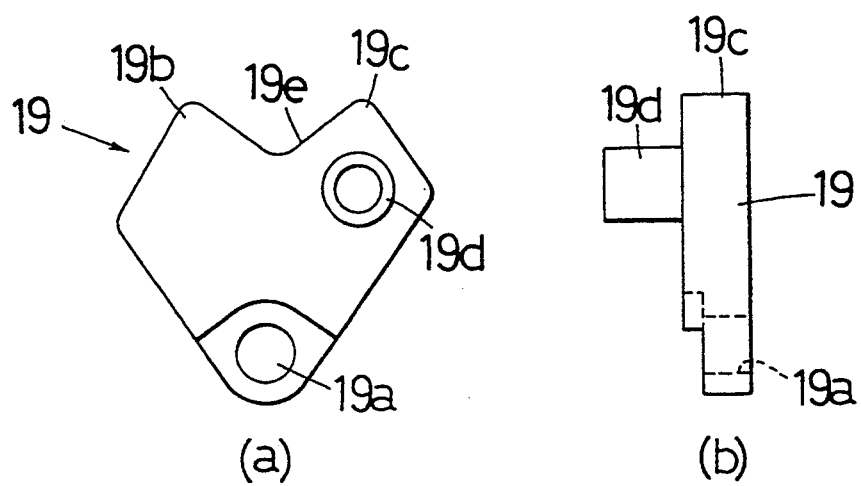
F I G. 9       F I G. 9

(a)

(b)

(a)

(b)

(c)

SEAT BELT RETRACTOR

BACKGROUND OF THE INVENTION

This invention relates to a seat belt apparatus installed in a vehicle such as an automobile for protecting a passenger. More particularly, the invention relates to a seat belt retractor for locking a reel shaft, which takes up the seat belt, against rotation in the event of an emergency to prevent the seat belt from being pulled off the reel shaft.

In order to prevent a seat belt from being pulled off a reel shaft by inertial motion of a passenger in the event of an emergency such as when a large deceleration acts upon the vehicle, the conventional seat belt retractor installed in a vehicle such as an automobile is provided with locking means for locking the reel shaft, which takes up the seat belt, against rotation.

One example of such reel-shaft locking means is as disclosed in the specification and drawings of U.S. Pat. No. 4,796,918. Specifically, frame locking-type locking means is disclosed in which teeth are formed on a reel shaft and on a frame supporting the reel shaft. When deceleration greater than a predetermined value acts upon the vehicle, the reel shaft moves so that its teeth mesh with the teeth on the frame, thereby locking the reel shaft against rotation. This frame locking-type locking means can be formed so as to be comparatively light in weight because the teeth are formed on the frame and therefore a special member having such teeth is unnecessary. Accordingly, such locking means is fully capable of lending itself to a reduction in weight presently demanded in vehicles such as automobiles.

In a retractor equipped with such locking means, the teeth provided on the reel shaft and the teeth on the frame are each subjected to a comparatively large force when the teeth on the reel shaft mesh with the teeth on the frame. This makes it necessary to form these teeth to have a large width so as to mitigate the stress which they develop. Accordingly, a measure taken in the prior art to mitigate the stress developed by these teeth is to enlarge the thickness of the teeth on the reel shaft and the plate thickness of the frame so as to increase the meshing width of the teeth, or to reinforce the frame by attaching to it teeth formed on a separate member. However, a problem encountered with the former measure is an increase in weight. With the latter measure, the need for a reinforcing member not only results in a large number of parts but also necessitates steps for attaching the reinforcing member, thereby increasing the labor required and raising cost.

Furthermore, in the frame locking-type locking means described above, teeth provided on both ends of the reel shaft must be meshed simultaneously with teeth provided on both the right and left sides of the frame. In actuality, however, it is difficult to effect meshing simultaneously on both the right and left sides, and meshing often takes place on one side only. In particular, since the teeth on the reel shaft and the teeth on the frame mesh owing to movement of the reel shaft, achieving simultaneous engagement on both the right and left sides is very difficult. In addition, in a case where the teeth mesh on one side only, stress concentrates in the meshing teeth and much greater strength is required as a result. The inevitable consequence is a retractor of large size and weight.

SUMMARY OF THE INVENTION

An object of the present invention is to provide a seat belt retractor in which reliability is improved by making it possible to lock the reel shaft against rotation with certainty by engaging it with the frame in a reliable manner.

Another object of the present invention is to provide a compact, light-weight seat belt retractor in which the mechanism can be simplified and cost reduced by facilitating assembly.

According to the present invention, the foregoing objects are attained by providing a seat belt retractor comprising a reel shaft for taking up a seat belt, a frame for freely rotatably supporting both ends of the reel shaft, locking means disposed between the frame and the reel shaft for allowing the reel shaft to turn when ordinary conditions prevail and for being actuated when necessary to lock the reel shaft against turning at least in a pulling direction of the seat belt, deceleration sensing means actuated when deceleration in excess of a predetermined value acts upon a vehicle, and lock actuating means for actuating the locking means in response to actuation of the deceleration sensing means, characterized in that the locking means has a first engaged portion provided on the frame on a side thereof corresponding to one end of the reel shaft, a first engaging member supported on the one end of the reel shaft and capable of being engaged with the first engaged portion, a second engaged portion provided on the frame on a side thereof corresponding to the other end of the reel shaft, and a second engaging member supported on the other end of the reel shaft and capable of being engaged with the second engaged portion, and the lock actuating means for performing engagement between the first engaged portion and the first engaging member and then engagement between the second engaged portion and the second engaging member of the deceleration sensing means.

The seat belt retractor of the present invention is further characterized by provision of seat belt pull-out sensing means actuated when the seat belt is pulled out at an acceleration in excess of a predetermined value, the lock actuating means being actuated also in response to actuation of the seat belt pull-out sensing means.

According to another aspect of the present invention, the foregoing objects are attained by providing a seat belt retractor comprising a reel shaft for taking up a seat belt, a frame for freely rotatably supporting the reel shaft, locking means disposed between the frame and the reel shaft for allowing the reel shaft to turn when ordinary conditions prevail and for being actuated when necessary to lock the reel shaft against turning at least in a pulling direction of the seat belt, seat belt pull-out sensing means actuated when the seat belt is pulled out at an acceleration in excess of a predetermined value, and lock actuating means for actuating the locking means in response to actuation of the seat belt pull-out sensing means, characterized in that the locking means has a first engaged portion provided on the frame on a side thereof corresponding to one end of the reel shaft, a first engaging member supported on the one end of the reel shaft and capable of being engaged with the first engaged portion, a second engaged portion provided on the frame on a side thereof corresponding to the other end of the reel shaft, and a second engaging member supported on the other end of the reel shaft and capable of being engaged with the second engaged portion, and the lock actuating means for performing engagement between the first engaged portion and the first engaging member and then engagement between the second engaged portion and the second engaging member upon actuation of said deceleration means.

The seat belt retractor of the present invention is further characterized in that the first engaged portion and the second engaged portion are composed of a predetermined number of first teeth and second teeth, respectively, formed on an inner circumferential surface of a circular hole formed in the frame; the first engaging portion and the second engaging portion are composed of a first pawl and a second pawl, respectively, capable of being engaged with the first and second teeth, respectively; and the lock adjusting means decides a tooth among the second teeth that is to be engaged by the second pawl after it decides a tooth among the first teeth that is to be engaged by the first pawl.

The seat belt retractor of the present invention is further characterized in that the lock actuating means has a first cam for guiding and actuating the first pawl, a second cam for guiding and actuating the second pawl, and linking means for operatively associating the first pawl and the second pawl.

The seat belt retractor of the present invention is further characterized in that the first cam is formed by a cam hole in a diametric direction, and the second cam is formed by a generally L-shaped hole composed of a hole in a diametric direction and a hole in a circumferential direction.

In the operation of the seat belt retractor of the invention constructed as set forth above, the lock actuating means is actuated to engage the first engaging member supported on the reel shaft with the first engaged portion of the frame and to engage the second engaging member supported on the reel shaft with the second engaged portion of the frame when deceleration in excess of the predetermined value acts upon the vehicle and/or when the seat belt is pulled at an acceleration in excess of the predetermined value.

In such case, the state in which the second engaged portion and the second engaging member are capable of engaging is set by the lock adjusting means after the state in which the first engaged portion and the first engaging member are capable of engaging has been set, and then engagement between the first engaged portion and the first engaging member and engagement between the second engaged portion and the second engaging member are effected by the lock adjusting means.

Accordingly, the engagement between the first engaged portion and the first engaging member and between the second engaged portion and the second engaging member takes place in reliable fashion, and therefore turning of the reel shaft in the seat belt pulling direction is reliably prevented at both sides of the reel shaft. This improves the reliability of the seat belt retractor. In particular, since the reel shaft can be locked relative to the frame without being moved, an even greater improvement is reliability is attained.

In addition, by reliably engaging the first engaged portion and the first engaging member as well as the second engaged portion and the second engaging member, concentration of stress caused by engagement on only one side no longer occurs, and therefore stress caused by engagement can be made very small. Accordingly, frame thickness need not be made as great and the reel shaft can be reduced in size. As a result, the retractor can be made small in size and light in weight as well.

Furthermore, the first and second engaging members are merely engaged with the first and second engaged portions, and the reel shaft undergoes no movement whatsoever. Therefore, the mechanism is simplified and the parts are fewer in number so that assembly labor is reduced and cost lowered.

In particular, by using pawls as the first and second engaging members and forming the first and second engaged portions by teeth, as in the present invention, engagement is made even more certain and the structure is simplified.

Furthermore, by using cams and cam holes in the lock adjusting means, a further simplification of structure is achieved and operation is made more reliable.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 3 is a sectional view taken along line III—III of FIG. 2 and showing the seat belt retractor of the embodiment in the assembled state;

FIG. 4 is a sectional view taken along line IV—IV of FIG. 3 and showing the seat belt retractor of the embodiment in the assembled state;

FIG. 9(a) and FIG. 9(b) illustrate a main pawl used in the embodiment, in which 9(a) is a plan view and 9(b) a side view;

DESCRIPTION OF THE PREFERRED EMBODIMENT

Figure 5:
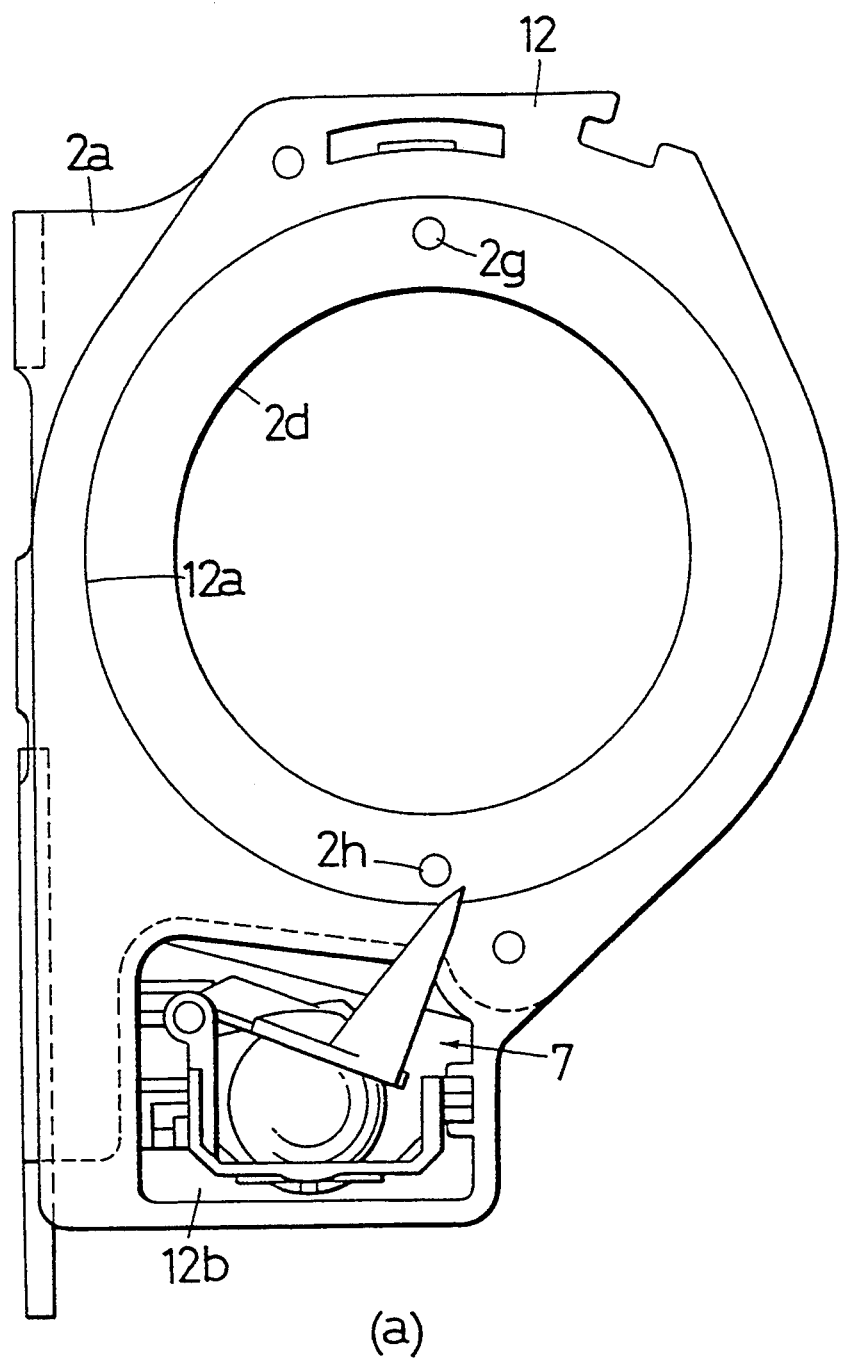
FIG. 5(a) and FIG. 5(b) illustrate a frame used in the embodiment, in which 5(a) is a left-side view of a state in which a retainer is attached, and 5(b) a right-side view.
Figure 5:
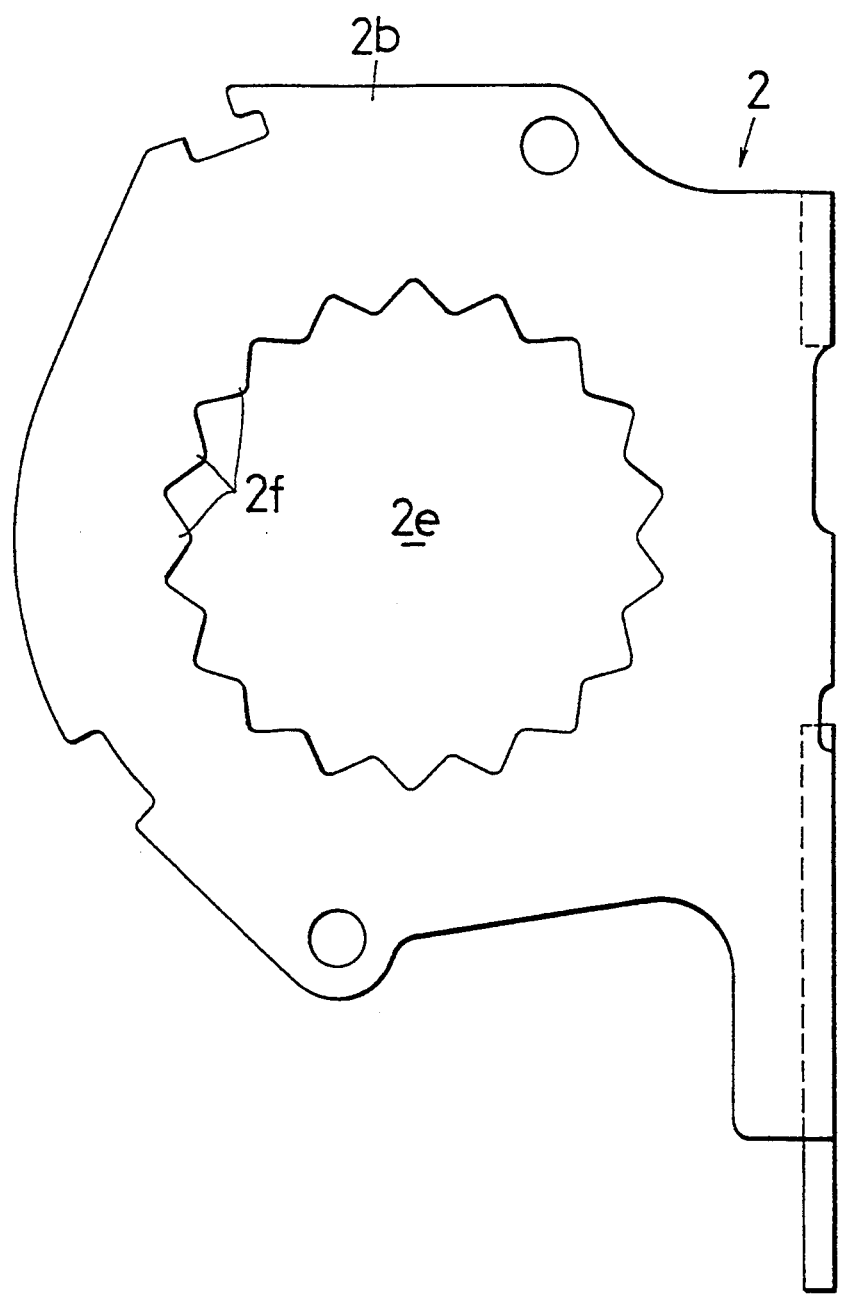

As illustrated in FIGS. 1 through 4, a seat belt retractor 1 according to this embodiment is equipped with a generally U-shaped frame 2 having left and right side walls 2a, 2b. The left and right side walls 2a, 2b are interconnected by a connecting member 2c, whereby the frame 2 is reinforced. The left side wall 2a is formed to have a circular hole 2d, as illustrated in FIG. 5 (a), and the right side wall 2b is formed to have a circular hole 2e, as depicted in FIG. 5 (b). A prescribed number of triangular teeth 2f are formed over the entire inner circumferential surface of a hole 2e in the right side wall 2b.

As shown in FIG. 3, a reel shaft 4 for taking up a seat belt 3 is disposed between the left and right side walls 2a, 2b of frame 2. As illustrated in FIG. 6(a), the left and right side faces of the reel shaft 4 are centrally provided with a first rotary shaft 4a and a second rotary shaft 4b, respectively. The left side face is formed to have a pair of sector-shaped, axially extending projections 4c, 4d, and the right side face is formed to have an irregular sector-shaped recess 4e. Further, one portion 4f between the two axially directed projections 4c, 4d and the recess 4e are provided with an axially directed hole 4g to communicate them. A pair of flanges 4h, 4i for guiding the seat belt 3 when it is taken up are formed near the left and right ends of the reel shaft 4.

Biasing means 5 which subjects the reel shaft 4 to a force for taking up the seat belt 3 is attached to the right side wall 2b. Seat-belt lock actuating means 6 is attached to the left side wall 2a, which is provided with deceleration sensing means 7. When a predetermined deceleration acts upon the vehicle, the deceleration sensing means 7 senses this deceleration and actuates the seat-belt lock actuating means 6.

The biasing means 5 comprises a spiral spring 8, a bush 9 to which an inner circumferential end 8a of the spiral spring 8 is connected so as to receive the spring force, a spring case 10 to which an outer circumferential end of the spiral spring 8 is secured, and which accommodates the spiral spring 8, and a cover 11 attached to the spring case 10 to cover the spiral spring 8.

The bush 9 is fitted on and connected to the second rotary shaft 4b so as to be incapable of rotating relative thereto. Accordingly, the force of the spiral spring 8 acts upon the reel shaft 4 at all times in a seat belt take-up direction B.

Figure 6:
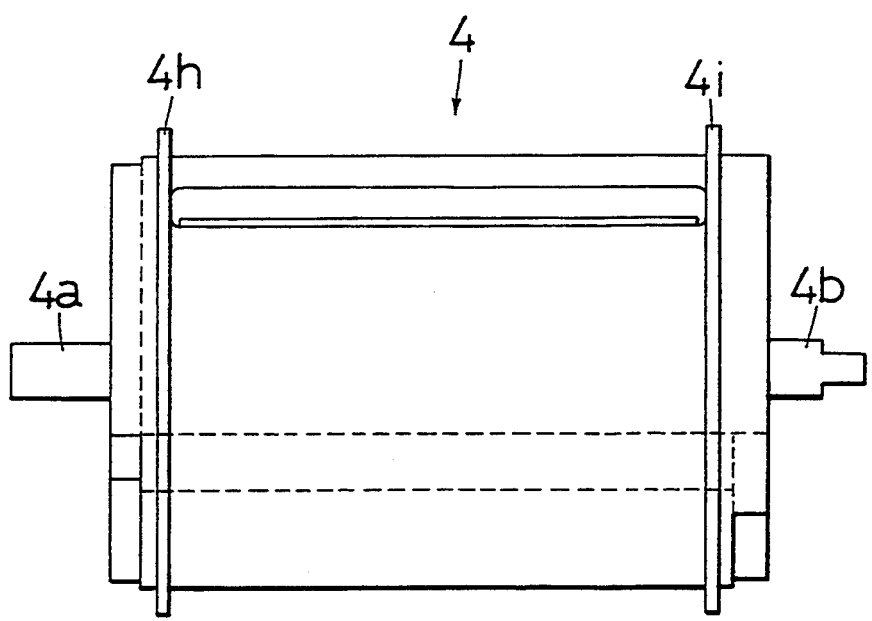
FIG. 6(a), FIG. 6(b) and FIG. 6(c) illustrate a reel shaft used in the embodiment, in which 6(a) is a front view, 6(b) a left-side view and 6(c) a right-side view.
Figure 6:
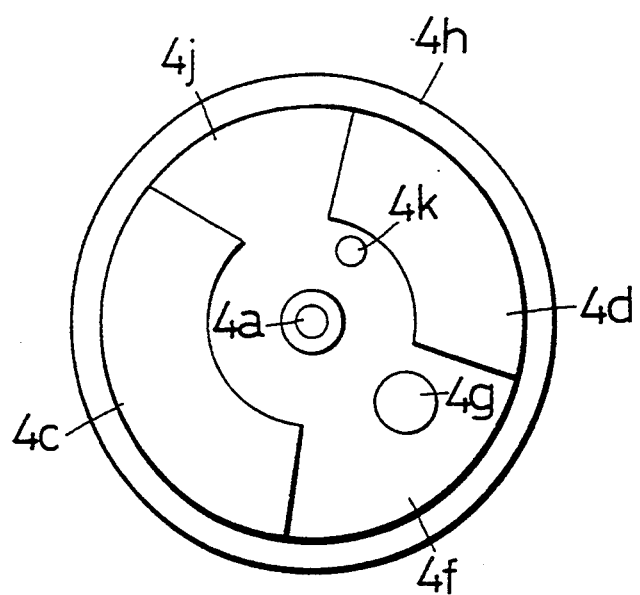
Figure 6:
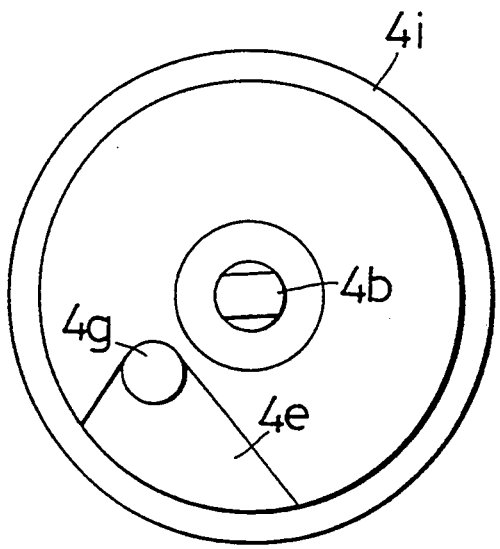

The seat-belt lock actuating means 6 comprises a retainer 12 secured to the left side wall 2a, a locking gear 13, an inertial body 14 oscillatably attached to the locking gear 13, a control spring 15 disposed between the locking gear 13 and the inertial body 14, a main pawl 19 arranged on another portion 4j [shown in FIG. 6 (b)] between the pair of axially directed projections 4c, 4d, an omega (Ω)-shaped return spring 16 disposed between the reel shaft 4 and the main pawl 19, an internal gear 20 secured to the retainer 12 and having a prescribed number of triangular teeth 20a formed over its entire inner circumferential surface, a joint pin 21 passes through the axially directed hole 4g of the reel shaft 4, a back-up pawl 22 connected to one end of the joint pin 21, and a cover 18 covering the locking gear 13. Numeral 23 in FIG. 1 denotes a webbing guide.

Figure 1:
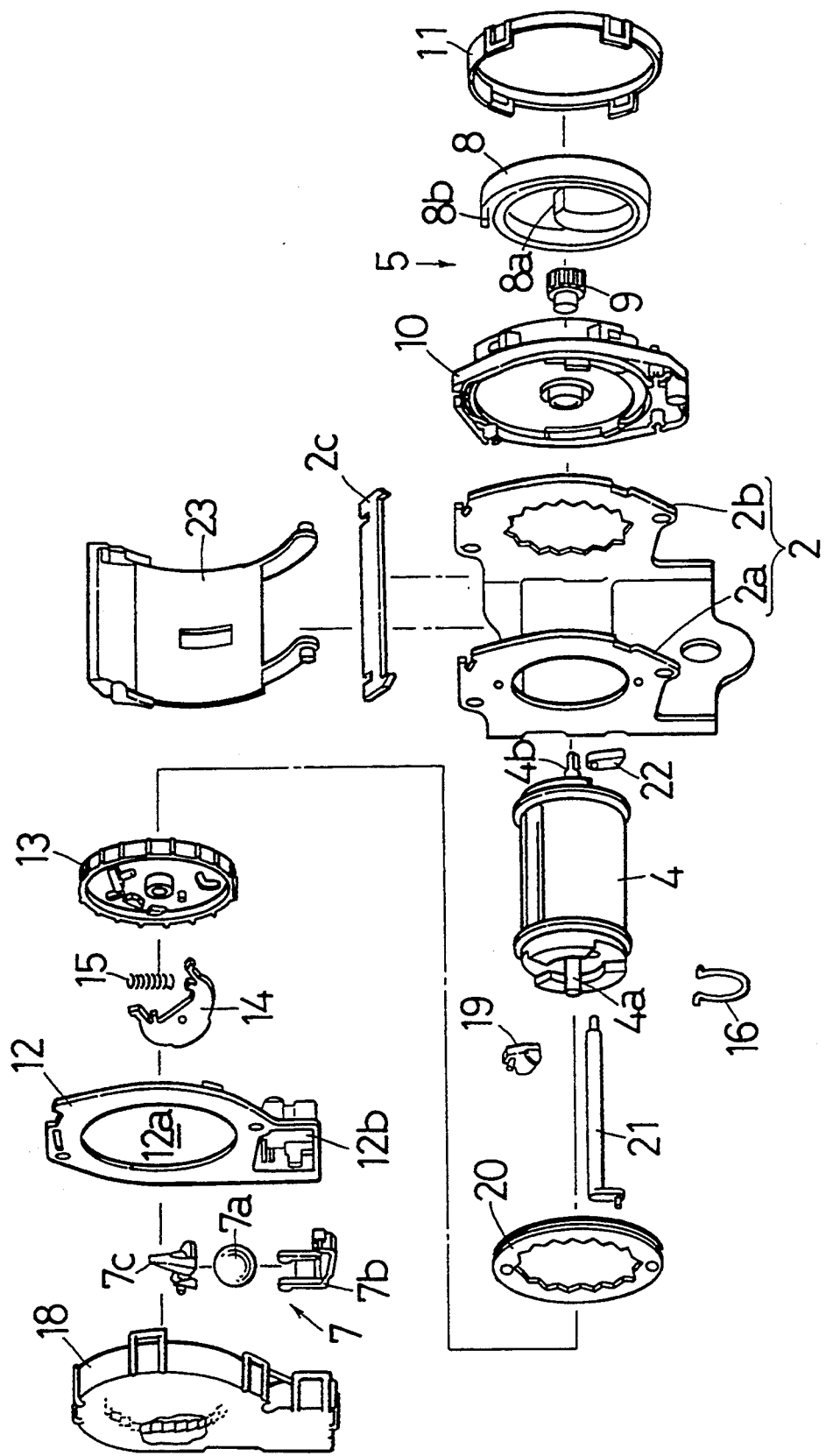
FIG. 1 is an exploded perspective view illustrating an embodiment of a seat belt retractor according to the present invention.

As shown in FIGS. 1 and 5 (a), the retainer 12 is formed as a flat plate and has a very large hole 12a. The lower portion of the retainer 12 has a mounting portion 12b for mounting the deceleration sensing means 7.

Figure 7:
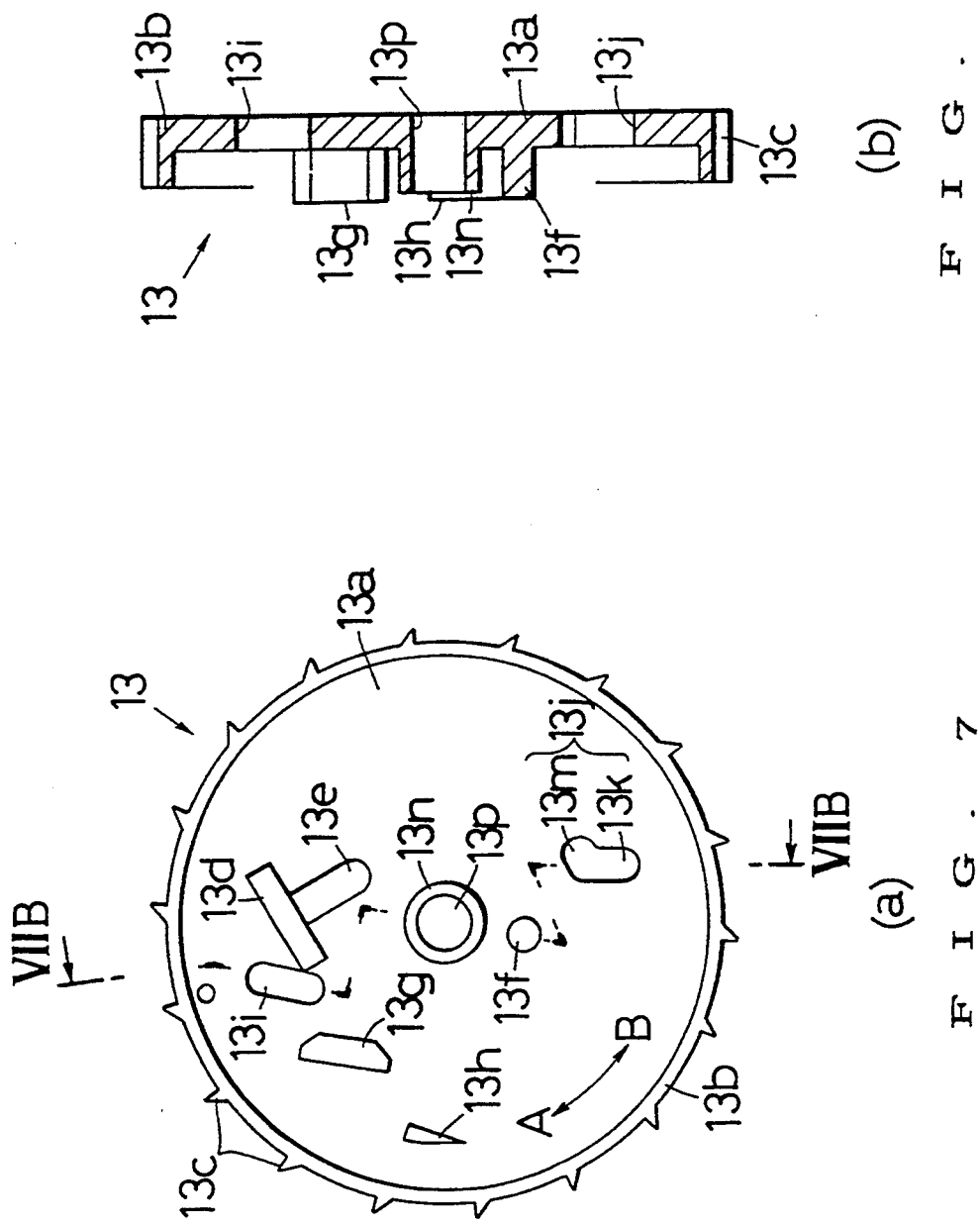
FIG. 7(a) and FIG. 7(b) illustrate a locking gear used in the embodiment, in which 7(b) is a sectional view taken along line IIIVB—IIIVB in 7(a).

The locking gear 13 is formed to have a circular flat plate 13a the outer periphery of which is formed to include an annular flange 13b, as depicted in FIG. 7 (a). The outer circumferential surface of the flange 13b is formed to have a predetermined number of teeth 13c. Each tooth 13c is triangular in shape. In this case, the tooth face opposing the seat belt pulling direction A defines a comparatively gentle slope, while the tooth face opposing the seat belt take-up direction B is approximately vertical.

As illustrated in FIG. 7(a), the left side face [in FIG. 7 (b)] of the flat plate 13a is provided with an upstanding spring seating member 13d, which in turn is provided with an upstanding spring guide 13e lying parallel to the flat plate 13a. Further, the flat plate 13a is provided with an upstanding shaft 13f, as well as with an upstanding first stopper 13g and an upstanding second stopper 13h.

The flat plate 13a is provided with an oval-shaped first cam hole 13i and an L-shaped second cam hole 13j. The first cam hole 13i is provided so as to slant from the inner side to the outer side in the seat belt pulling direction A. The second cam hole 13j comprises a diametrically extending hole 13k slanted from the inner side to the outer side in the seat belt pulling direction A, and a circumferentially directed hole 13m extending from the inward end of the hole 13k.

The center of the flat plate 13a is provided with an upstanding rotary shaft 13n and a through-hole 13p passing through the rotary shaft 13n.

Figure 2:
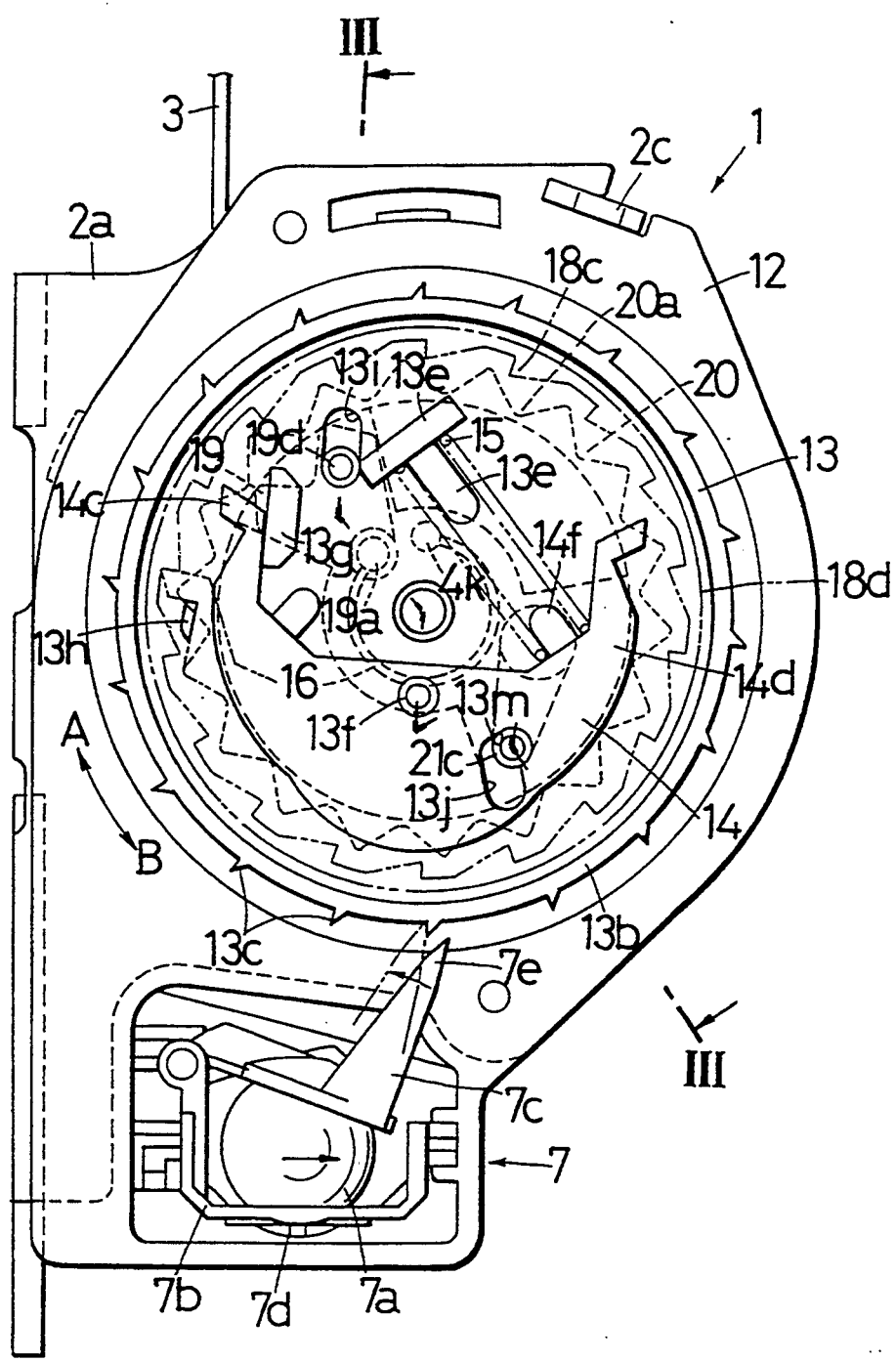
FIG. 2 is a left-side view of the seat belt retractor in a state where a cover has been removed, and shows the seat belt retractor of the embodiment in the assembled state.
Figure 8:
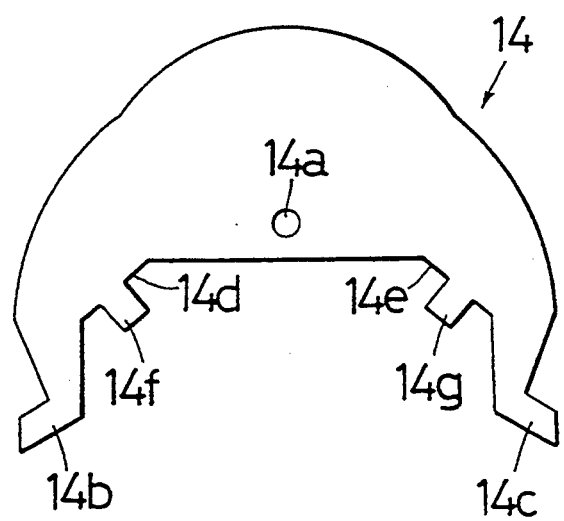
FIG. 8 is a diagram showing an inertial body used in the embodiment.

As depicted in FIG. 8, the inertial body 14 is formed into a generally h-shaped configuration from a flat plate and is provided with a centrally located hole 14a. The two ends of the inertial body 14 are formed to have respective locking pawls 14b, 14c, and spring seats 14d, 14e and spring guide portions 14f, 14g are provided between the two locking pawls 14b, 14c. As shown in FIG. 2, the inertial body 14 is rockably supported on the locking gear 13 by fitting the shaft 13f of locking gear 13 into the hole 14a. The control spring 15 is fitted onto the guide portions 13e, 14f and is compressed between the spring seating member 13d and spring seat 14d. Owing to the spring force of the control spring 15, the inertial body 14 is biased relative to the locking gear 13 at all times in the A direction. Under ordinary conditions, the inertial body 14 is in abutting contact with the first stopper 13i, as indicated by the solid line. When the inertial body 14 is rotated in the B direction relative to the locking gear 13 against the spring force of the control spring 15, it abuts against the second stopper 13h, as illustrated by the phantom lines.

As illustrated in FIG. 9, the main pawl 19 is formed into a generally sector-shaped configuration provided with a through-hole 19a. The outer peripheral surface of the sector-shaped body is formed to have a pair of locking pawls 19b, 19c. The main pawl 19 is further provided with an axially extending projecting shaft 19d near one of the locking pawls 19c, and is formed to include a V-shaped recess 19e between the two locking pawls 19b, 19c. The V-shaped recess 19e is capable of being engaged with one of the triangular teeth 20a of the internal gear 20.

One end of the Ω-shaped spring 16 is fastened to the hole 4k of the real shaft 4, and the other end thereof is fastened to the hole 19a of the main pawl 19. By virtue of the Ω-shaped spring 16, the main pawl 19 is biased relative to the reel shaft 4 at all times in the seat belt pulling direction A.

Figure 10:
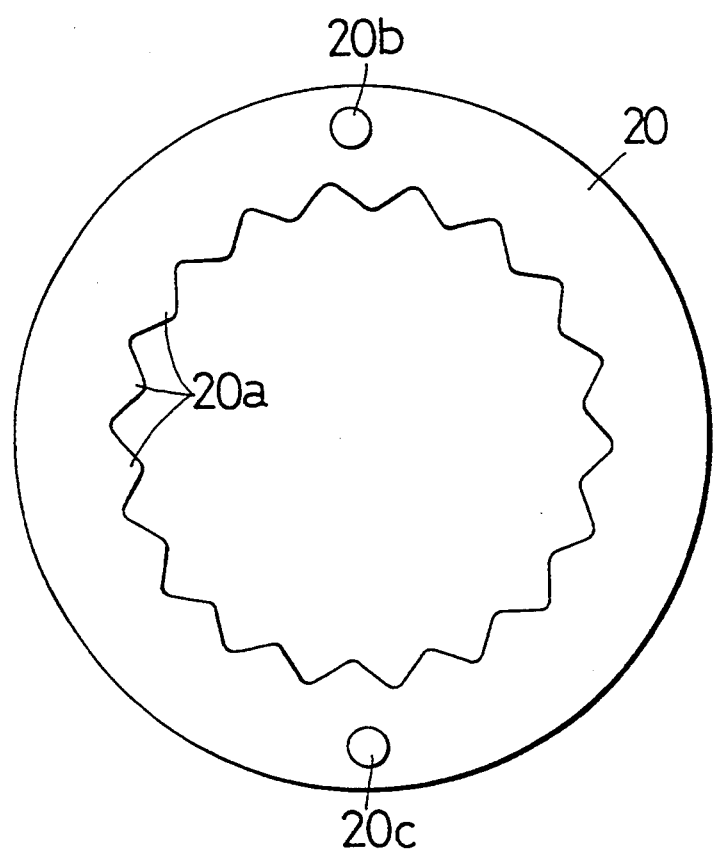
FIG. 10 is a plan view showing an internal gear used in the embodiment.

As shown in FIG. 10, the internal gear 20 is formed from a ring-shaped flat plate the entire inner circumferential surface of which is formed to have the prescribed number of triangular teeth 20a. The triangular teeth 20a are formed to have exactly the same shape as, and to be exactly equal in number to, the teeth 2f formed on the right side wall 2b of the frame 2. The internal gear 20 is disposed inside the hole 12a of the retainer 12 and is secured to the left side wall 2a by passing passing tightening members such as screws through a pair of mounting holes 20b, 20c, one of which is located above the other, and screwing them into a pair of holes 2g, 2h, one located above the other, of the left side wall 2a of frame 2.

The arrangement is such that when the internal gear 20 is secured to the left side wall 2a, one tooth 20a of the internal gear 20 and one tooth 2f of the right side wall 2b will be in perfect coincidence in the circumferential direction.

Figure 11:
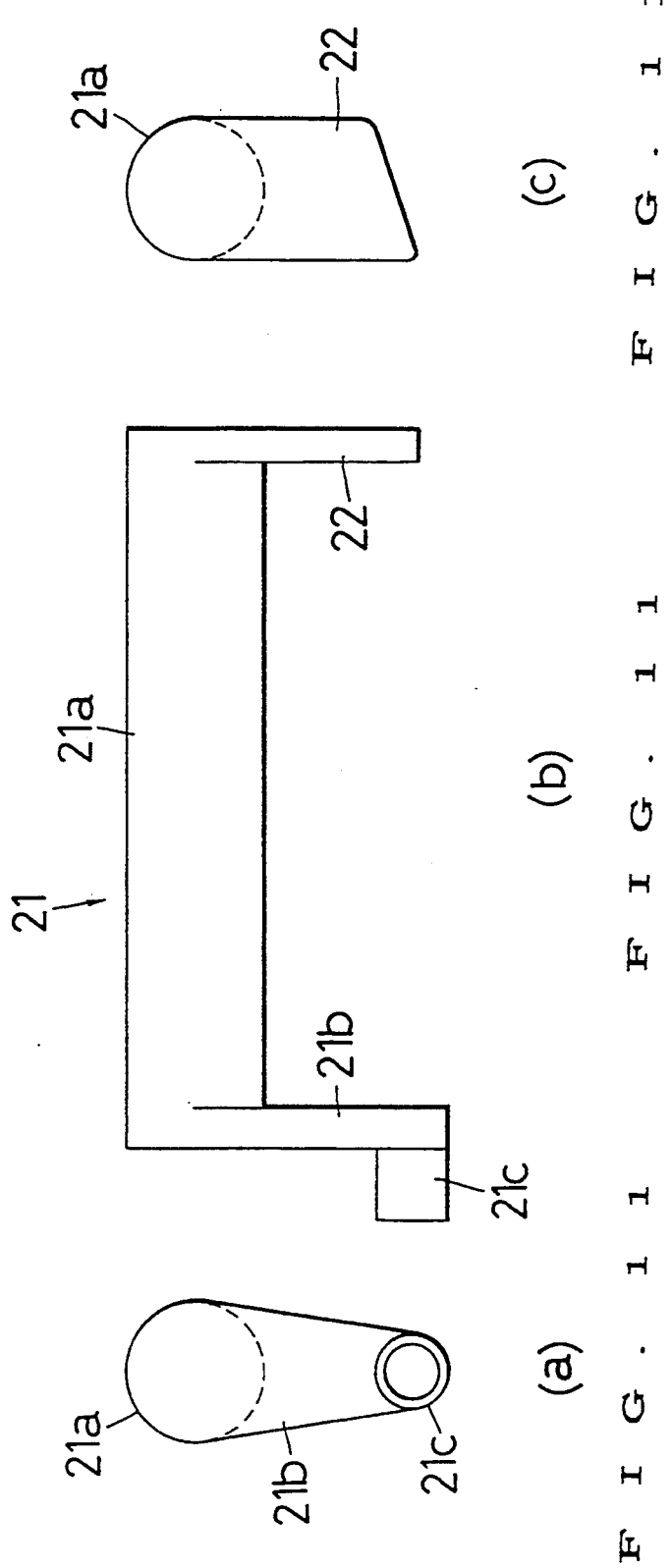
FIG. 11(a), FIG. 11(b) and FIG. 11(c) illustrate an assembly composed of a joint pin and a back-up pawl used in the embodiment, in which 11(a) is a left-side view, 11(b) a front view and 11(c) a right-side view.

As illustrated in FIG. 11, the joint pin 21 includes an arm portion 21b formed integral with the left end of a shaft portion 21a, and an axially extending projecting shaft 21c provided on the distal end of the arm portion 21b. The back-up pawl 22 is secured to the right end of the shaft portion 21a and is adapted to rotate in unison with the arm portion 21b in the same direction. As depicted in FIG. 4, the back-up pawl 22 is capable of being engaged, in the seat belt pulling direction A, with the triangular teeth 2f formed on the right side wall 2b of the frame 2.

The arrangement is such that when the locking gear 13 is installed by passing the first rotary shaft 4a of the reel shaft 4 through the through-hole 13p in the rotary shaft 13n of the locking gear 13, the projecting shaft 19d of the main pawl 19 passes through the first cam hole 13i of the locking gear 13 and the projecting shaft 21c of the joint pin 21 passes through the second cam hole 13j of the locking gear. In this case, since the main pawl 19 is biased relative to the main shaft 4 in the seat belt pulling direction A by means of the Ω-shaped return spring 16, the locking gear 13 also is biased relative to the reel shaft 4 in the A direction via the projecting shaft 19d.

Under ordinary conditions in which the locking gear 13 is being biased, the arrangement is such that the projecting shaft 19d is set at a position at which it abuts against the inward end of the first cam groove 13i while the projecting shaft 21c is set at a position at which it abuts against the end of the circumferentially directed 13m of the second cam hole 13j. In this state the first and second locking pawls 19b, 19c of the main pawl 19 are at positions where they do not engage the teeth 20a of the internal gear 20, and the back-up pawl 22 is at a position where it does not engage with the teeth 2f on the right side wall 2b of the frame 2.

Figure 12:
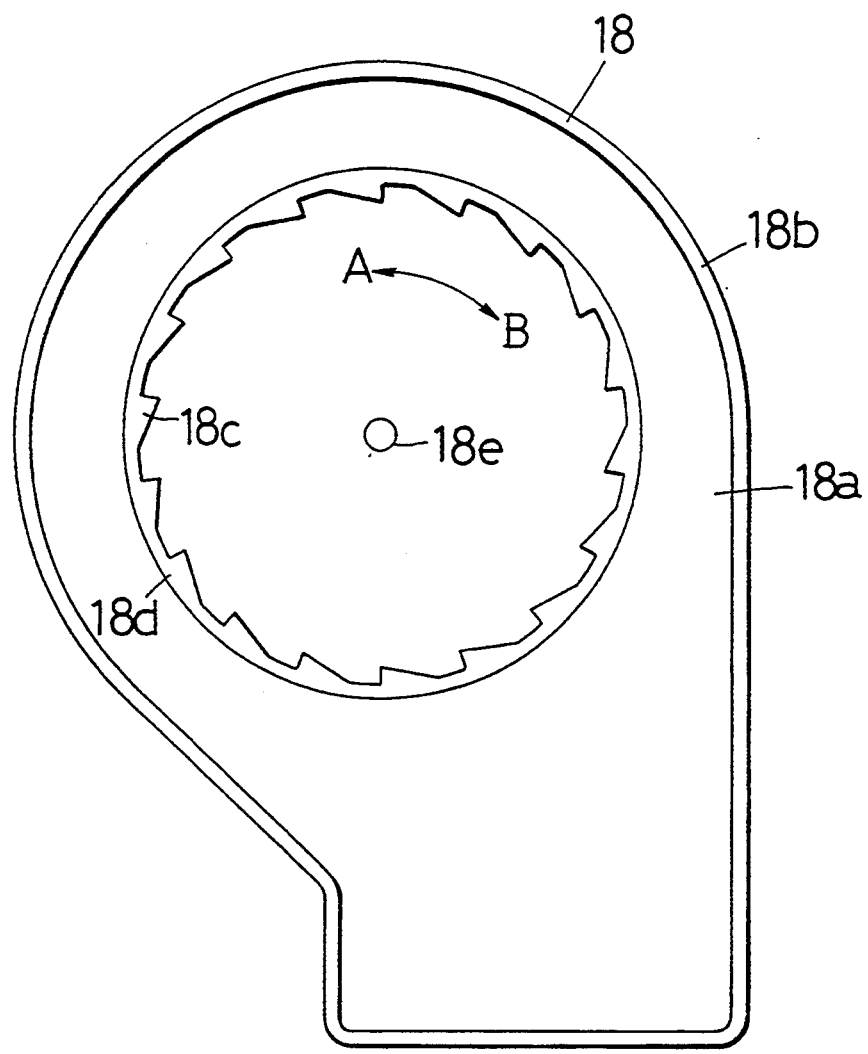
FIG. 12 is a plan view of a cover used in the embodiment.

As shown in FIG. 3, the cover 18 is adapted to cover the locking gear 18, the inertial body 14 and the deceleration sensing means 7 and is removably attached to the retainer 12. As illustrated in FIG. 12, the cover 18 comprises a flat plate portion 18a of a prescribed shape, and a flange portion 18b provided over the entire circumferential edge of the plate portion. The flat plate portion 18a is provided with an annular toothed member 18d formed to have a prescribed number of teeth 18c on its inner circumferential surface. Each tooth 18c is triangular in shape. The tooth face opposing the seat belt pulling direction A is approximately vertical, while the tooth face opposing the seat belt take-up direction B defines a gentle slope.

With the cover 18 in the attached state, the annular toothed member 18d is situated between the flange 13b and the inertial body 14 on the inner side of the flange 13b of locking gear 13, as illustrated in FIGS. 2 and 3. Under ordinary conditions, as described above, the spring force of the control spring 15 holds the inertial body 14 at a position where it is in abutting contact with the first stopper 13g, and therefore the locking pawl 14c is held at a non-engaging position at which it is remote from the teeth 18c. Further, when the inertial body 14 is rocked or oscillated relative to the locking gear 13 against the spring force of the control spring 15 to be brought into abutting contact with the second stopper 13q, the locking pawl 14c comes to be situated at an engaging position where it is capable of engaging the teeth 18c.

If the locking gear 13 is rotated in the seat belt pulling direction A when the locking pawl 14c is in the engaging position, the locking pawl 14c engages the teeth 18c so that the locking gear 13 is locked against any further rotation in the seat belt pulling direction A. If the locking gear 13 is rotated in the seat belt take-up direction B when the locking pawl 14c is in the engagable position, the locking pawl 14c moves along the gently sloping surface of the tooth 18c against the control spring 15 and eventually moves beyond the tooth 18c, as a result of which the locking gear 13 is rendered capable of rotation in the seat belt take-up direction B.

The central portion of the annular toothed member 18d is provided with a projection 18e. When the cover 18 is attached, as depicted in FIG. 3, the projection 18e is fitted into a hole 4m of the reel shaft 4, thereby positioning the annular toothed member 18d of the cover 18 accurately with respect to the locking gear 13.

The operation of the main pawl 19 and back-up pawl 22 will now be described in detail with reference to FIG. 13. It should be noted that FIG. 13 is a typical view, in which the two sets of gear teeth 2f, 20a, main pawl 19 and back-up pawl 22 are drawn in the same plane.

Figure 13A:
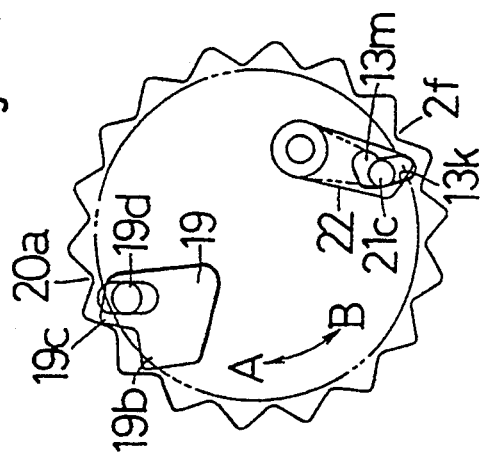
FIG. 13 is a diagram for describing the operation of the main pawl and back-up pawl used in the embodiment.

In FIG. 13(a), the main pawl 19 is biased at all times in the A direction by the spring force of the Ω-shaped return spring 16, and therefore the locking gear 13 and the arm portion 21b of the joint pin 21 are both biased in the A direction. Accordingly, the locking gear 13 turns in the A direction relative to the reel shaft 4. As a consequence, the locking gear 13 turns relative to the reel shaft 4 in the A direction until the projecting shaft 19d is at the position where it abuts against the inward end of the first pawl hole 13i. At this position, the locking gear 13 is stopped and held at rest.

Meanwhile, the projecting shaft 21c of the arm portion of the joint pin 21 is situated at the position where it abuts against the end portion of the circumferentially directed hole 13m of the second cam hole 13j. In this state the main pawl 19 and the backup pawl 22 are both at non-engaging positions where they do not engage the teeth 20a and 2f, respectively.

Figure 13B:
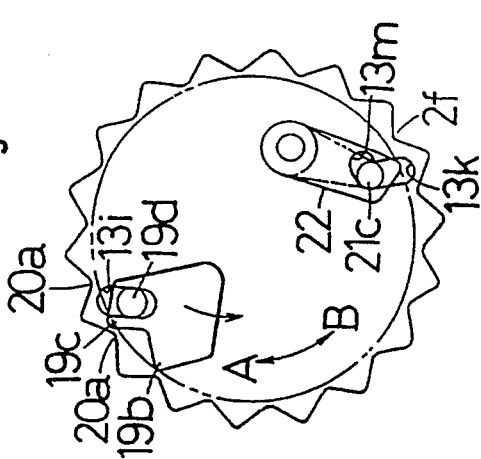

When the locking gear 13 turns relative to the reel shaft 4 in the B direction, the projecting shaft 19d moves while being guided by the first cam hole 13i, as depicted in FIG. 13(b). In response to this movement of the projecting shaft 19d, the main pawl 19 turns in the B direction, namely toward the teeth 20a, so that teeth 20a engage with the first and second locking pawls 19b, 19c.

Meanwhile, the projecting shaft 21c of the arm portion 21b of joint pin 21 moves to the other end of the circumferentially directed hole 13m while being guided by the hole 13m. In this case, the projecting shaft 21c merely moves along the circumferentially directed hole 13m. As a result, the arm portion 21b turns hardly at all and therefore neither does the back-up pawl 22. Consequently, the back-up pawl 22 maintains the attitude which prevails in the ordinary state.

Figure 13C:
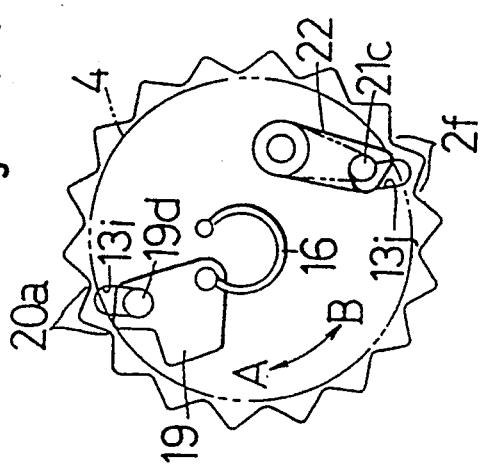

When the locking gear 13 turns further relative to the reel shaft 4 in the B direction, the projecting shaft 19d moves further while under the guidance of the first cam hole 13i, as shown in FIG. 13(c), whereby the main pawl 19 turns further toward the teeth 20a so that the first and second locking pawls 19b, 19c start to engage with the teeth 20a. Meanwhile, the projecting shaft 21c of the arm portion 21b moves under the guidance of the diametrically directed hole 13k, and hence the back-up pawl 22 turns in the B direction, namely toward the teeth 2f, so that teeth 2f engage with the back-up pawl 22.

Figure 13D:
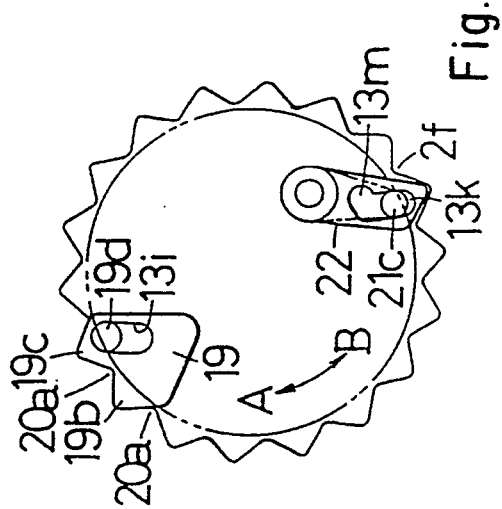

When the locking gear 13 turns further relative to the reel shaft 4 in the B direction, the projecting shaft 19d moves further while under the guidance of the first cam hole 13i, as shown in FIG. 13(d), whereby the main pawl 19 turns further toward the teeth 20a so that the engagement between the first and second locking pawls 19b, 19c and the teeth 20a proceeds. Meanwhile, the projecting shaft 21c of the arm portion 21b moves further under the guidance of the diametrically directed hole 13k, and hence the back-up pawl 22 starts to engage with the teeth 2f.

Figure 13E:
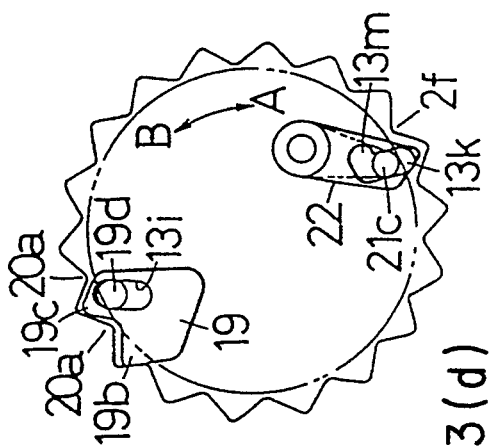

When the locking gear 13 turns still further relative to the reel shaft 4 in the B direction, the projecting shaft 19d moves further while under the guidance of the first cam hole 13i, as shown in FIG. 13(e), whereby the main pawl 19 turns further toward the teeth 20a so that the first and second locking pawls 19b, 19c come into perfect engagement with the teeth 20a. Meanwhile, the projecting shaft 21c of the arm portion 21b moves further under the guidance of the diametrically directed hole 13k so that complete engagement is achieved between the back-up pawl 22 and the teeth 2f and, at the same time, between the first and second locking pawls 19b, 19c and the teeth 20a.

Thus, the main pawl 19, back-up pawl 22 and teeth 20a, 2f construct seat belt locking means.

In the seat belt retractor 1 of this embodiment, first the teeth 20a are engaged by the first and second locking pawls 19b, 19c of the main pawl 19, then the teeth 2f are engaged by the back-up pawl 22. As a result, a failure will not develop in at least the engagement between the main pawl 19 and teeth 20a or the engagement between the back-up pawl 22 and the teeth 2f, and therefore the engagement will take place in reliable fashion.

As illustrated in FIG. 1, the deceleration sensing means 7 comprises an inertial ball 7a, a support base 17b for supporting the inertial ball 7a, and an actuator 7c attached to the support base 7b so as to be capable of being rocked by movement of the inertial ball 7a. As shown in FIG. 2, the support base 7b is provided with a recess 7d on which the inertial ball 7a is placed. The inertial ball 7a is supported by the recess 7d in such a manner that it will undergo almost no movement under ordinary conditions. When deceleration in excess of a predetermined value acts upon the vehicle, the inertial ball 7a escapes from the recess 7d and moves forwardly as indicated by the arrow in FIG. 2.

The distal end of the actuator 7c is formed to have a locking pawl 7e. Under ordinary conditions, the actuator 7c is in a non-engaging position where it is remote from the teeth 13e of the locking gear 13, as indicated by the solid lines in FIG. 2. When the inertial ball 7a moves to the right in FIG. 2, the actuator 7c is turned upward as indicated by the arrow so that the locking pawl 7e, (now indicated by the phantom line) assumes an engaging position where it engages with the teeth 13e.

The operation of the embodiment constructed as set forth above will now be described.

Operation under Ordinary Conditions in Which Deceleration Greater Than a Predetermined Value Does Not Act upon the Vehicle Under these conditions, the inertial ball 7a of the deceleration sensing means 7 does not move and therefore the actuator 7c resides at the position indicated by the solid line shown in FIG. 2 and the locking pawl 7e resides at the non-engaging position at which it is remote from the teeth 13e of the locking gear 13. Similarly, the locking pawl 14c of the inertial body, the main pawl 19 and the back-up pawl 22 also are at their non-engaging positions, as shown in FIGS. 3 and 4.

Accordingly, mainly the operation performed by the seat belt retractor 1 under these conditions is that of the biasing means 5. In other words, owing to the spring force of the biasing means 5, the reel shaft 4 is biased in the seat belt take-up direction B, as a result of which the seat belt 3 is taken up.

Operation when the Seat Belt Has Not Been Fastened

In this state, a tongue (not shown) attached to the seat belt 3 and a buckle member (not shown) are in a separated condition. Accordingly, the state is such that the seat belt 3 is taken up owing to the spring force of the spring 8, as set forth earlier.

Operation when the Seat Belt Is Pulled Out

When the passenger pulls out the seat belt 3 in order to fasten it, this is accompanied by rotation of the reel shaft 4 and bush 9 in the seat belt pulling direction A. As a consequence, the spring 8 is wound up and tightened.

Operation when Passenger's Hand Is Removed from the Seat Belt after the Tongue and Buckle Member Are Connected When the tongue and buckle member have been connected together by the passenger, the seat belt 3 will have been pulled out by a length in excess of a normal length required to restrain the passenger. Therefore, when the passenger releases the seat belt 3 after the above-described connecting operation, the seat belt 3 is taken up by the spring force of spring 8 until the belt is fitted to the body of the passenger. The spring force of spring 8 is suitably decided in such a manner that the seat belt 3 will not subject the passenger to an oppressive sensation at this time. As long as the vehicle is not subjected to deceleration in excess of a predetermined value, the seat belt retractor 1 maintains this state during travel of the vehicle.

Operation when Deceleration Greater than a Predetermined Value Acts upon the Vehicle When deceleration greater than a predetermined value acts upon the vehicle as a result of, say, emergency braking during vehicle travel, the seat belt lock actuating means 6 and deceleration sensing means 7 both operate. In a first stage of operation, the inertial ball 7a of the deceleration sensing means 7 is moved forwardly (in the direction of the arrow in FIG. 2) owing to deceleration, as a result of which the actuator 7c turns upward to assume the position indicated by the phantom lines in FIG. 2. Consequently, the locking pawl 7e assumes the engaging position. Meanwhile, since the body of the passenger attempts to lunge forwardly due to this vehicle deceleration in excess of the predetermined value, the seat belt 3 is pulled but, in response thereto, the reel shaft 4 and the locking gear 13 turn in the pulling direction A.

However, because the teeth 13c of locking gear 13 are quickly engaged by the locking pawl 7e, turning of the locking gear 13 in the pulling direction A is soon halted. As a result, only the reel shaft 4 continues to turn in the pulling direction A, and hence relative turning motion develops between the locking gear 13 and the reel shaft 4. In other words, the locking gear 13 turns relative to the reel shaft 4 in the B direction.

In a second stage of operation, the main pawl 19 and back-up pawl 22 turn and engage with the teeth 20a and 2f, respectively, as shown in FIGS. 13(b) through 13(e), owing to the relative turning motion of the locking gear 13. Thus, turning of the reel shaft 4 in the seat belt pulling direction A is prevented. As a result, it is possible to reliably prevent pull-out of the seat belt 3 caused by inertial forward lunging movement of the passenger. Thus, the passenger is restrained with assurance and is protected against injury.

Operation when a Sudden Pulling Force Acts upon the Seat Belt

In this state the seat belt 3 is pulled suddenly, and therefore the reel shaft 4, locking gear 13 and inertial body 14 attempt to turn suddenly in the seat belt pulling direction A. However, since the spring force of the control spring 15 is not that great, the control spring 15 is compressed and the inertial body 14 produces an inertial delay. More specifically, the inertial body 14 not only revolves along with the locking gear 13 in the seat belt pulling direction A but also rotates relative to the locking gear 13 in the B direction. Thus, the inertial body 14 constructs seat belt pull-out sensing means.

Owing to rotation of the inertial body 14, the locking pawl 14c moves to its engaging position at which it abuts against the second stopper 13h, as indicated by the phantom lines in FIG. 2. In addition, the locking pawl 14c engages with the teeth 18c. As a consequence, the inertial body 14 is prevented from revolving and the locking gear 13 is locked against rotation in the seat belt pulling direction A. Accordingly, only the reel shaft 4 rotates in the seat belt pulling direction A. By virtue of this operation, the locking gear 13 turns relative to the reel shaft 4 in the B direction, as mentioned earlier.

Owing to this relative rotation of the locking gear 13, the main pawl 19 and back-up pawl 22 turn and engage the teeth 20a, 2f, respectively, whereby the reel shaft 4 is prevented from turning in the seat belt turning direction A. As a result, it is possible to reliably prevent pull-out of the seat belt 3 caused by inertial forward lunging movement of the passenger. Thus, the passenger is restrained with assurance and is protected against injury.

The present invention is not limited to the foregoing embodiment but can be modified in various ways. For example, though the teeth 2f, 20a respectively provided on the right side wall 2b of frame and on the internal gear 20 are formed to be triangular in shape in the embodiment described above, the teeth 2f, 20a can be formed into any other appropriate shape.

Furthermore, though the biasing means 5 in the foregoing embodiment is not provided with a comfort device, the present invention is applicable to a seat belt retractor provided with a comfort device.

Furthermore, in the foregoing embodiment, a case is described in which the present invention is applied to a seat belt retractor so adapted that tension is applied to the seat belt 3 by the biasing means. However, it goes without saying that the present invention can be applied also to a tensionless seat belt retractor.

Thus, in accordance with the seat belt retractor of the present invention, as should be evident from the foregoing description, the engagement between the first engaged portion and the first engaging member and between the second engaged portion and the second engaging member is performed in reliable fashion by the lock adjusting means, and therefore turning of the reel shaft in the seat belt pulling direction can be reliably prevented at both sides of the reel shaft.

In addition, concentration of stress caused by engagement on only one side no longer occurs, and therefore stress caused by engagement can be made very small. Accordingly, frame thickness need not be made as great and the reel shaft can be reduced in size. As a result, the retractor can be made small in size and light in weight as well.

Furthermore, the first and second engaging members are merely engaged with the first and second engaged portions, and the reel shaft undergoes no movement whatsoever. Therefore, the mechanism is simplified and the parts are fewer in number so that assembly labor is reduced and cost lowered.

What is claimed is:

1. A seat belt retractor for use in a vehicle, comprising:
    a reel shaft for taking up a seat belt;
    a frame for freely rotatably supporting said reel shaft at both ends thereof;
    locking means disposed between said frame and said reel shaft for allowing said reel shaft to turn when ordinary conditions prevail and for being actuated when necessary to lock said reel shaft against turning at least in a pulling direction of the seat belt;
    deceleration sensing means actuated when deceleration in excess of a predetermined value acts upon the vehicle; and
    lock actuating means for actuating said locking means in response to actuation of said deceleration sensing means;
    said locking means comprising:
        a first engaged portion provided on said frame on a side thereof corresponding to one end of said reel shaft;
        a first engaging member supported on the one end of said reel shaft and capable of being engaged with said first engaged portion;
        a second engaged portion provided on said frame on a side thereof corresponding to the other end of said reel shaft;
        a second engaging member supported on the other end of said reel shaft and capable of being engaged with said second engaged portion, wherein said first engaged portion and said second engaged portion are composed of a predetermined number of first teeth and second teeth, respectively, formed on an inner circumferential surface of a circular hole formed in said frame;

said first engaging portion and said second engaging portion are composed of a first pawl and a second pawl, respectively capable of being engaged with the first and second teeth, respectively, wherein lock actuating means comprises:
- a first cam formed by a cam hole in a diametric direction for guiding and actuating said first pawl;
- a second cam formed by a generally L-shaped hole composed of a hole in a diametric direction and a hole in a circumferential direction for guiding and actuating said second pawl; and
- linking means for operatively associating said first pawl and said second pawl, and wherein said lock actuating means selects a tooth from among the second teeth that is to be engaged by said second pawl after said lock actuating means selects a tooth among the first teeth that is to be engaged by said first pawl, thereby causing said first engaged portion to be engaged with said first engaging member before said second engaged portion is engaged with said second engaging member upon action of said deceleration sensing means.

2. A seat belt retractor for use in a vehicle, comprising:
- a reel shaft for taking up a seat belt;
- a frame for freely rotatably supporting said reel shaft;
- locking means disposed between said frame and said reel shaft for allowing said reel shaft to turn when necessary to lock said reel shaft against turning at least in a pulling direction of the seat belt;
- seat belt pull-out sensing means actuated when the seat belt is pulled out at an acceleration in excess of a predetermined value; and
- lock actuating means for actuating said locking means in response to actuation of said seat belt pull-out sensing means;

said locking means comprising:
- a first engaged portion provided on said frame on a side thereof corresponding to one end of said reel shaft;
- a first engaging member supported on the one end of said reel shaft and capable of being engaged with said first engaged portion;
- a second engaged portion provided on said frame on a side thereof corresponding to the other end of said reel shaft; and
- a second engaging member supported on the other end of said reel shaft and capable of being engaged with second engaged portion, wherein said first engaged portion and said second engaged portion are composed of a predetermined number of first teeth and second teeth, respectively, formed on an inner circumferential surface of a circular hole formed in said frame;

said first engaging portion and said second engaging portion are composed of a first pawl and a second pawl, respectively capable of being engaged with the first and second teeth, respectively, wherein said lock actuating means comprises:
- a first cam formed by a cam hole in a diametric direction for guiding and actuating said first pawl;
- a second cam formed by a generally L-shaped hole composed of a hole in a diametric direction and a hole in a circumferential direction for guiding and actuating said second pawl; and
- linking means for operatively associating said first pawl and said second pawl, and wherein said lock actuating means selects a tooth from among the second teeth that is to be engaged by said second pawl after said lock actuating means selects a tooth among the first teeth that is to be engaged by said first pawl thereby causing said first engaged portion to be engaged with said first engaging member before said second engaged portion is engaged with said second engaging member upon action of said deceleration sensing means.

* * * * *